(12) United States Patent
Mackenthun et al.

(10) Patent No.: US 11,734,255 B2
(45) Date of Patent: Aug. 22, 2023

(54) INTERFACE FOR POINT OF USE DATA GOVERNANCE

(71) Applicant: HARTFORD FIRE INSURANCE COMPANY, Hartford, CT (US)

(72) Inventors: Scott Mitchell Mackenthun, West Hartford, CT (US); James A. Madison, Windsor, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 0 days.

(21) Appl. No.: 17/086,787

(22) Filed: Nov. 2, 2020

(65) Prior Publication Data

US 2021/0049151 A1 Feb. 18, 2021

Related U.S. Application Data

(63) Continuation of application No. 15/849,172, filed on Dec. 20, 2017, now Pat. No. 10,824,619.

(51) Int. Cl.

| G06F 7/02 | (2006.01) |
|---|---|
| G06F 16/00 | (2019.01) |
| G06F 16/23 | (2019.01) |
| G06F 16/11 | (2019.01) |
| G06F 16/22 | (2019.01) |
| G06F 16/2455 | (2019.01) |
| G06Q 10/10 | (2023.01) |
| G06Q 40/08 | (2012.01) |
| G06Q 50/18 | (2012.01) |

(52) U.S. Cl.
CPC ........ *G06F 16/2365* (2019.01); *G06F 16/122* (2019.01); *G06F 16/2291* (2019.01); *G06F 16/24564* (2019.01); *G06Q 10/10* (2013.01); *G06Q 40/08* (2013.01); *G06Q 50/182* (2013.01)

(58) Field of Classification Search
CPC ............... G06F 16/2365; G06F 16/122; G06F 16/2291; G06F 16/24564; G06Q 10/10; G06Q 40/08; G06Q 40/00; G06Q 50/182
See application file for complete search history.

(56) References Cited

U.S. PATENT DOCUMENTS

| 8,515,795 | B2 | 8/2013 | Marrelli et al. |
|---|---|---|---|
| 9,734,172 | B2 | 8/2017 | Halberstadt et al. |
| RE48,056 | E * | 6/2020 | Hoffberg .................. G06F 3/00 |
| 10,997,532 | B2 * | 5/2021 | Govindugari ......... G06T 11/206 |
| 2003/0191665 | A1 * | 10/2003 | Fitzgerald .............. G16H 50/20 705/2 |

(Continued)

*Primary Examiner* — Bruce M Moser
(74) *Attorney, Agent, or Firm* — Volpe Koenig

(57) ABSTRACT

The present system and method is directed to a process to facilitate trusted sources of information in an enterprise. The present system and method positions data governance to move away from the element level and focus on the data asset (i.e. repository, interface, subject) level. When data persons are having any issue with their data asset, whether it is a conflicting data asset, interface issues, competing data asset, new data asset build, data subject issue, or the like, a certifier may operate to assess the asset based on our well defined metrics, determine the health through the data asset scoring process, recommend asset services, and provide those services to the data owner who is ultimately responsible for implementing them to improve the data and the data processes.

20 Claims, 8 Drawing Sheets

(56) References Cited

U.S. PATENT DOCUMENTS

| | | | |
|---|---|---|---|
| 2004/0111302 A1* | 6/2004 | Falk | G06Q 40/02 |
| | | | 705/4 |
| 2004/0210540 A1* | 10/2004 | Israel | G06Q 50/188 |
| | | | 705/80 |
| 2010/0332973 A1 | 12/2010 | Kloiber et al. | |
| 2011/0041161 A1 | 2/2011 | Capati et al. | |
| 2015/0106151 A1 | 4/2015 | Krishnaswamy | |
| 2016/0203571 A1* | 7/2016 | Beshah | G06Q 10/10 |
| | | | 705/309 |
| 2016/0283962 A1* | 9/2016 | Chan | G06Q 40/08 |
| 2017/0124154 A1 | 5/2017 | Halberstadt et al. | |
| 2018/0239870 A1* | 8/2018 | Goldman | G06Q 40/08 |
| 2019/0294613 A1 | 9/2019 | Sullivan et al. | |

* cited by examiner

INTERFACE FOR POINT OF USE DATA GOVERNANCE

CROSS REFERENCE TO RELATED APPLICATIONS

This application is a continuation of U.S. patent application Ser. No. 15/849,172, filed Dec. 20, 2017, which is incorporated by reference as if fully set forth.

FIELD OF INVENTION

The present invention is directed to an interface used to facilitate trusted sources of information in an enterprise through point of use data governance.

BACKGROUND

The data governance community has made attempts to govern data at an element level. This is the most granular level of data and from an enterprise perspective the number of elements is impossibly large. As a result, enterprise resources have focused on governing naming conventions of data elements and organizing data stewards to complete the names. In many industries there are tens of thousands of elements. The effort required to name, define, and rationalize that number of elements can be overwhelming.

Additionally, the data governance must account for differences in terminology between different groups within the enterprise. Such differences exponentially add to the number of elements and issues among elements. For example, people in finance for the enterprise might have a different definition or understanding of "loss" compared to those persons in the actuarial group. Such a difference may be directed solely to timing issues. By additional example, determining the zip code of a facility may similarly cause confusion. As a result, current attempts at industry data governance have gone awry.

Therefore, there is a need for a process to facilitate trusted sources of information in an enterprise.

SUMMARY

The present system and method is directed to a process to facilitate trusted sources of information in an enterprise. The present system and method positions data governance to move away from the element level and focus on the data asset (i.e. repository, interface, subject) level. When data persons are having any issue with their data asset, whether it is a conflicting data asset, interface issues, competing data asset, new data asset build, data subject issue, or the like, a certifier may operate to assess the asset based on our well defined metrics, determine the health through the data asset scoring process, recommend asset services, and provide those services to the data owner who is ultimately responsible for implementing them to improve the data and the data processes.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1:
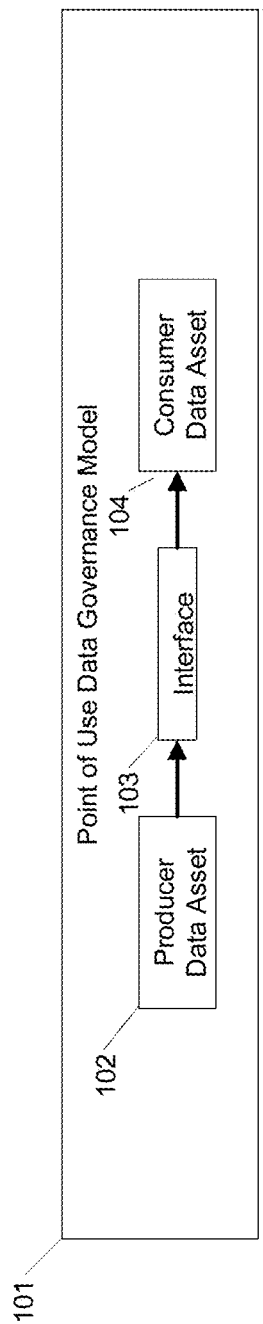
FIG. 1 illustrates a system employing a point of use data governance model.

The present system and method is directed to a process to facilitate trusted sources of information in an enterprise. The present system and method positions data governance to move away from the element level and focus on the data asset (i.e. repository, interface, subject) level. When data persons are having any issue with their data asset, whether it is a conflicting data asset, interface issues, competing data asset, new data asset build, data subject issue, or the like, a certifier may operate to assess the asset based on our well defined metrics, determine the health through the data asset scoring process, recommend asset services, and provide those services to the data owner who is ultimately responsible for implementing them to improve the data and the data processes.

The present system and method provide for tracking data subject content independent and contiguously through data repositories. Insurance data subjects like claims and customer data consist of numerous types of data elements. These elements may be difficult to group and trace from producing to consuming data asset. Data certification can be used to bring numerous data owners together to trace the elements among producing and consuming data assets and document these flows in an enterprise data flow.

The present system and method for identifying the properties of data that most improve decision making when improved. In the insurance industry there are certain critical data elements like customer credit score and zip code that are pivotal to rating an insured. Data certification can be used to identify these data assets and trace them among producing and consuming owners. Additionally, data certification can be used to improve these properties based on identified services such as programmatic controls which can be used to monitor the health of such properties.

The present system and method for data owners to continuously identify data asset deficiencies. Within the insurance industry there are multiple insurance functions such as claims, property and casualty producers, underwriting, and actuarial. These functions are typically under different areas of ownership. Thus, there is a need from an enterprise perspective to be able to trace ownership from producing and consuming assets when issues arise. Data certification and the process there within can be used to move the issue up stream and hold data owners accountable.

The present system and method audit, score, and evaluate asset properties informing data owners which properties must be improved to facilitate decision making. Data certification is measured on some well-defined metrics (Fitness for Use, Proprietary Data Knowledge, Ownership, Artifacts, and Controls). After the certification is complete, the certifier evidences if any of the metrics need to be improved. This remediation information may be published within the asset description based on information collected via the scoring process. Then the results are rolled up into the scoreboard and data asset scorecard. The levels of reporting can be used to audit, score, evaluate, and inform data owners which of the metrics are deficient.

The present system and method allows for data owners to identify data asset services to improve data asset deficiencies. Once the asset description is published to the data owners to identify the improvements needed. Data owners may select the service and improve the data asset.

The present system and method allows for ensuring data owners to identify ownership, accountabilities and empowerments. Using the ownership model it is known enterprise wide which data assets are owned and used by data owners and data persons. The data certification process demands that ownership be defined as one of the key metrics.

The present system and method provides for ensuring data owners identify receipt of data elements outside of the scope of accountability. During data certification the enterprise data flow diagram is filled out. Thus, data owners inherently are able to identify where the data elements come from and through the standard ownership model be able to contact owners outside of their accountability to remediate. If unsuccessful in remediation, owners may leverage data certification to engage the producing owners through the identification of the interface.

The present system and method provides for connecting data ownership from point of intake to end of stream consumption by a single data owner independent of the black box in the middle. Ownership is a key metric that is identified. Typically in insurance, owners are dispersed based on business process and function such as claims, underwriting which are core functions performed enterprise wide. This inherently brings about a diffuse level of ownership and accountability. Data certification allows for the connection of data ownership from point of intake to end stream consumption by a single data owner by targeting the interface of a producing and consuming data asset.

The present system and method programmatically enforces data quality rules, controls, and thresholds in an audit, balance, and control fashion. Within the insurance industry there are tens of thousands of data elements used to rate, quote, and maintain business. The sheer amount of data cannot be manually verified via human interaction thus programmatic controls are necessary to enforce data asset health. Because of this data certification requires well defined metric controls. A data certifier assesses these programmatic data quality rules and controls. If the rules and controls are insufficient, the data owner is responsible for implementing based on services recommended and provided via data certification.

The present system and method programmatically predicts data quality issues through the use data quality rules, controls, and thresholds in an audit, balance, and control fashion. Within the insurance industry there are tens of thousands of data elements used to rate a quote, and maintain business. If the service of programmatic controls is implemented across numerous interfaces the certifier may be able to identify and predict were data issues are occurring and target data certification to that interface to improve the data asset.

The present system and method represent the flow of data at different layers of grain using data flow diagrams or graph databases. Within any insurance company there are numerous data assets that communicate with multiple other data assets. These cannot be memorized and must be documented. Through the use of graph databases and other flow diagram tools such as Visio the ability to enforce trusted sources of information based on the known flow of information is possible. Through data certification a data asset is identified and its relationship and communication to other data assets are defined, documented and housed in flow diagram systems of graphing databases. This can be tied to the owner of assets and the controls implemented for quick identification of issues and notification to owners to rapidly prioritize and resolve issues. All of this information is captured and displayed within a data flow diagram or graph database.

The present system and method for data owners to escalate data issues to upstream systems. When a consuming data asset has a data issue via one or more of its asset interfaces a certifier through the process of data certification identifies the assets and their health based on some well-defined metrics. The issues are identified and pushed to the proper data owner. Various services are leveraged to improve the overall health of the data asset.

The present system and method organize, search, and find knowledge materials on data assets. Within the insurance industry there are various taxonomies and structures to search and organize data. Through the use of a dominate taxonomy within the knowledge management asset service we group information based on reporting collection which encompasses the major segments and functions of any insurance industry.

The present system and method evaluate and grow data persons using an issue management system. Issue management systems have standard data tracking tags so that every data issue that is resolved maps back to a data person. These tags can be used to identify the data person subject matter experts. Thus an insurance company can retain these data persons. Additionally, management having identified these data persons can use them to grow other data persons so that data issues are resolved faster in the future and data person backups are in place in case of turn over.

The present system and method define a data asset. Data certification can be used to define authoritative data sources based on data subject. Additionally, data certification can be used to resolve conflicting data assets. Example related to insurance would be in the actuarial practice and financial practice timing of losses is handled differently. Thus, data assets among actuarial and finance may have the same data but they calculate loss based on a combination of data elements such as loss and time of loss to reach a different loss conclusion. Thus data certification would confirm that these are not conflicting or deficient data assets. Rather they are relevant for their insurance business process and purpose.

The present system and method binds data owners contractually to deliver data by defined patterns. If a data asset is deemed to be deficient by a data certifier according to the well-defined metrics. The certifier would leverage the interface contracts service to name owners and bind them to certain SLAs and OLAS.

The present system and method for data person to capture metadata. If a data asset is deemed to be deficient by a data certifier according to well defined metrics (artifacts in this case). The certifier may leverage the metadata artifacts service to improve their Artifacts metric.

The present system and method reports out on the health of a data asset through metrics and dashboards. The insurance industry requires multiple data assets for it to function as a wide variety of state and federal requirements deem it necessary for data to be stored and derived to meet said requirements. Thus leadership within an insured requires an understanding of the health of data assets to ensure that decision making is made on data assets that are fit for use. As a certifier completes data certification the results are reported out in an asset description and later rolled up to the data asset scoreboard and further rolled up to a data asset scorecard. These reports contain the health of a data asset at various grains of consumption depending on the role within an insured.

The present system and method improve the data independent and continuously through data repositories as a certifier completes data certification via the certification, scoring process which is typically targeted at the data interface level. Issues move from one data asset to another to ultimately identify root cause. As data certification moves the issue outside of any one area of ownership improvement in the data occurs within many data assets (i.e. repositories).

The present system and method define data processes independent and continuously through data repositories. Data certification touches data processes related to data persons, data owners, data assets, and data services used by data process. In order to complete data certification a data certifier interacts with data persons, data owners, data assets, and data services to further define these processes amongst various repositories based on the interfaces in question between producers and consumers of the data subject.

Figure 4:
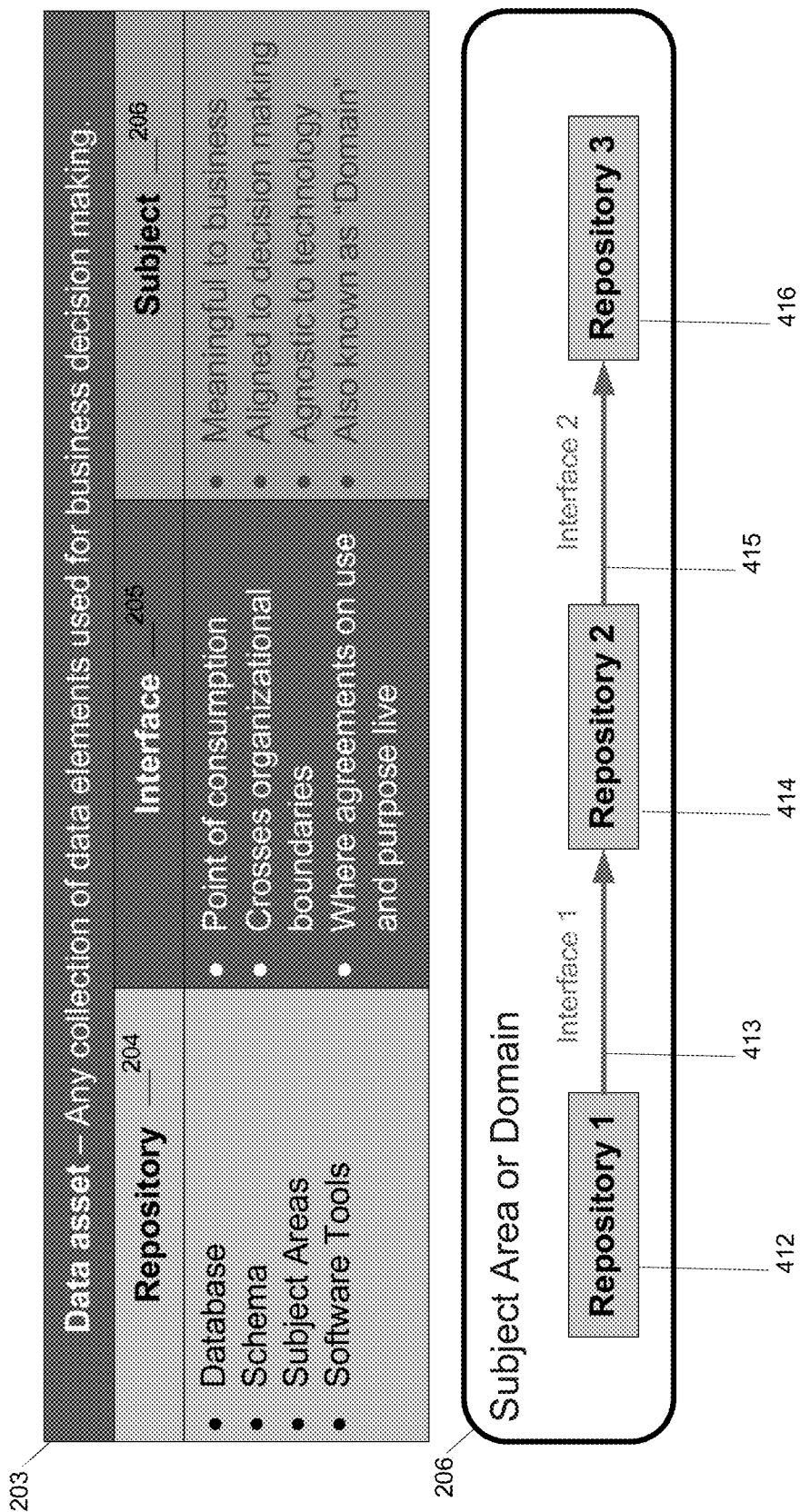
FIG. 4 illustrates data assets in the present system.

The present system and method trace issue resolution back to source. If for instance as seen in FIG. 4, repository 3 is having an issue, the certifier identifies the repository. The certifier would use data certification on the repository and determine if the well-defined metric attributes are proper. Then, the certifier may move the root cause analysis up to repository B and determine if the issue originated there. This process repeats between repositories A and B if the root cause analysis identifies that the issue is in Repository A. The certifier issues an asset description for the two interfaces (A:B and B:C). The certifier then issues low or high scores based on the well-defined metrics.

The present system and method detect and resolve interface issues, conflicting data assets, authoritative data sources, competing data assets, and govern new data assets.

FIG. 1 illustrates a system 101 employing a point of use data governance model. System 101 includes a producer 102 of a data asset. This data asset is made available to a consumer 104 of the data asset via an interface 103. Generally, system 101 provides data governance through data certification and focuses on data moving between data assets, as this is where consumers 104/producers 102 become accountable to each other.

The producer 102 of the data asset may include an asset that produces the data and is held accountable by the consumer 104 of the data asset based on published requirements. The consumer 104 of the data asset may include an asset that consumes data from a producer 102 via the interface 103. The consumer 104 is responsible for publishing the requirements so that the producer 102 may properly produce the data.

The interface 103 is the main focus of governance as this is the place where it becomes an enterprise issue and this is the point of use for data issues within producers 102 and consumers 104 are left for local resolution.

The focus on the interface 103 enables system 101 to focus on data in motion. System 101 may monitor the data behaviors in the upstream source that cause issues in the downstream target. Conceptually the main focus of governance principles includes the idea that no data asset may break another data asset, and data asset documentation may be robust and locatable.

By using the interface 103, system 101 deals with the place where enterprise issues arise—that is, issues within producers 102 and consumers 104 are left for local resolution. The goal of the certification process is to facilitate the interface between producers 102 and consumers 104 to determine solutions best for the assets and system 101 as a whole.

Figure 2:
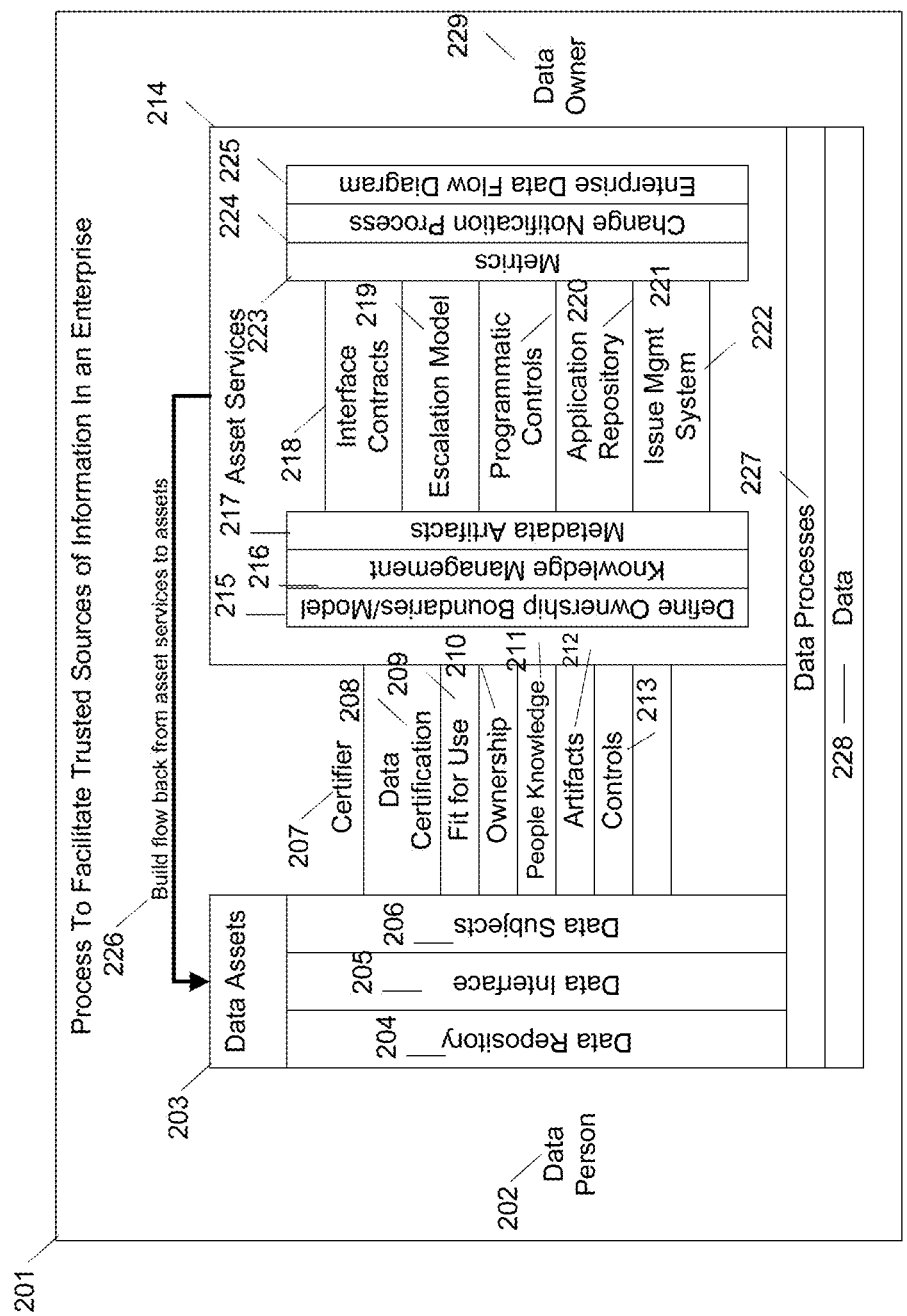
FIG. 2 illustrates a system that facilitates trusted sources of information via interface of FIG. 1.

FIG. 2 illustrates a system 201 that facilitates trusted sources of information via interface 103 of FIG. 1. The system 201 may include data certification. Data certification focuses on data moving between data assets where business units become accountable to each other. Within system 201 are the processes, assets, elements, and servers needed to complete data certification.

System 201 includes data assets 203 that are built upon or in a data repository 204, using a data interface 205 and indicating data subjects 206. The data assets 203 are interconnected with the underlying data 228 and data processes 227. The data 228 and data processes 227 are connected to asset services 214.

Asset services 214 include a first group of services including defined ownership and boundaries model 215, knowledge management 216 and metadata artifacts 217. Asset services 214 include a second group of services including metrics 223, change notification process 224 and enterprise data flow 225. A number of controls and links may connect the first group and second group of asset services 214. These include interface controls 218, escalation models 219, programmatic controls 220, application repositories 220 and issue management systems 221.

Data assets 203 and the underlying data repository 204, data interface 205 and data subjects 206 may be interconnected with asset services 214 via a certifier 207, data certification 208, fit for use 209, ownership 210, people knowledge 211, artifacts 212 and controls 213. A feedback flow 226 may be configured from asset services 214 to assets 203.

Data asset 203 includes any collection of data used to make a decision. Data asset 203 may be within repositories, interfaces, or subject areas, with interfaces being the primary point of enterprise data governance and management.

Data repository 204 may include, but is not limited to, databases, schemas, subject areas, and software tools. Data interface 205 includes, but is not limited to, points of data consumption, data crossing organizational boundaries, and places where data agreements on use and purpose define interactions between repositories and subjects. System 201 operates enterprise governance at the point of use. That is, the interface where repositories 204 and subjects 206 come together to give a decision maker the data needed to be effective. Data subjects 206 are groupings and tags that are meaningful to the business, aligned to decision making or business functions, agnostic to technology. These data subjects 206 may be referred to as domains in the insurance industry.

Certifier 207 may be a computer or individual on the enterprise data governance team within system 201. Certifier 207 may perform the certification process on any given data asset 203. This certification may include assessing any data asset 203 based on defined metrics, for example. Data certification 208 represents the certification process. Data certification 208 may be the step where the certifier 207 works to move the ownership of data issues to the system of record, builds out an enterprise library of data documentation, and give visibility of the portfolio to the board. Data certification 208 focuses on the data interface 205. However, data certification 208 may be performed on new data assets 203, conflicting data assets, identification of authoritative assets, and the like. Data certification 208 focuses on set of well-defined primary metrics, such as across a 0 to 3, or tin to gold scale. Such metrics may include fit for use 209, proprietary data knowledge 211, ownership 210, artifacts 212, and controls 213. Data certification 208 may involve the certifier 207 interacting with the producing and consuming units to determine the health of the data asset 203 including how to resolve issues. More detail on this element will be discussed herein with respect to FIG. 3.

Fit for use 209 defines the tendency of the data asset 203 to be accurate for its purpose, easy in its use, and generally trusted by the consuming community. Ownership 210 identifies computers and personnel including business and technical data persons 202 that are actively involved in protecting and enhancing the health and proper use of the asset. People knowledge 211 includes systems that know the data content, such as without performing research, how the data content works for the business, and can use that knowledge to solve and prevent problems. Artifacts 212 include any documentation that exists, is maintained, and is discoverable. Artifacts include information that inform about the asset and its contents in a manner that facilitates both business use and technical maintenance. Controls 213 include rules that captured in the data artifacts 212, interface contracts, SLAs, or other policies are automated as part of system operations and the results provided for user insight and action. The data certifications 208, fit for use 209, ownership 210, people knowledge 211, artifacts 212, and controls 213 collectively operate to identify the properties of data that when improved lead to improved decision making and/or which properties may be improved to improve decision making.

Asset services 214 operate after data certifications 208 are performed by the governing organizations offers services to improve the metrics. These services 214 are focused on "the what" which is making a healthy data assets. Services are not necessarily focused on how to get there, i.e., there may be numerous ways to write a control. This process only concerns itself with whether or not those controls are written and discoverable.

Asset services 214 include define ownership boundaries/ model 215, knowledge management 216, and metadata artifacts 217. Define ownership boundaries/model 215 include the mechanisms in place to identify, document, and notify those involved when owners of a data asset 203 are unknown. Knowledge management 216 includes the way in which data documentation is organized, including, but not limited to, standardized taxonomies which allow for quick navigation of data artifacts 212. Metadata artifacts 217 include the way in which data assets are documented.

Interface contracts 218 include the documentation form in which two or more data assets agree to communicate and deliver data. Escalation model 219 includes the process of moving issue ownership to the source. Programmatic controls 220 include written query based on a test and expected results which produces a pass/fail notification via a report to a data owner. The programmatic controls 220 may be used to monitor the health of data and identify data asset deficiencies. Application repository 221 is the standardized storage repository for key data asset artifacts. Issue management system 222 is the standardized mechanism for tracking, storing, and reporting data asset issues.

Metrics 223 provide a report of a data assets health. Change notification process 224 includes a process that provides a forum for data changes to be discussed and communicated by upstream data producing applications and process to downstream data consuming application and processes. This results in an early warning for all data changes that may impact downstream consumers. Enterprise data flow diagram 225 includes an enterprise view in the business context of how one data asset interfaces with another data asset.

Build flow back from asset serves to assets 226 includes providing feedback as asset services are implemented from the impact on data assets 203.

Data processes 227 includes certification by a certifier 207 and finally remediated based on necessary asset services for each time a data person interacts with data assets. Data processing 227 continues to happen and affect the data owner 229. Once these processes 227 are enhanced by the asset services 214, processes 227 affect the data owner 229 and data person 202 in a positive manner. Data 228 includes certification by a certifier 207 and finally remediated based on necessarily asset services 214 as a data person 202 interacts with data assets. Data continues to propagate and be consumed which affects the data person 202. Once this data is certified and enhanced by asset services 214, this in turn affects the data owner 229 and data person 202 in a positive manner.

Figure 3:
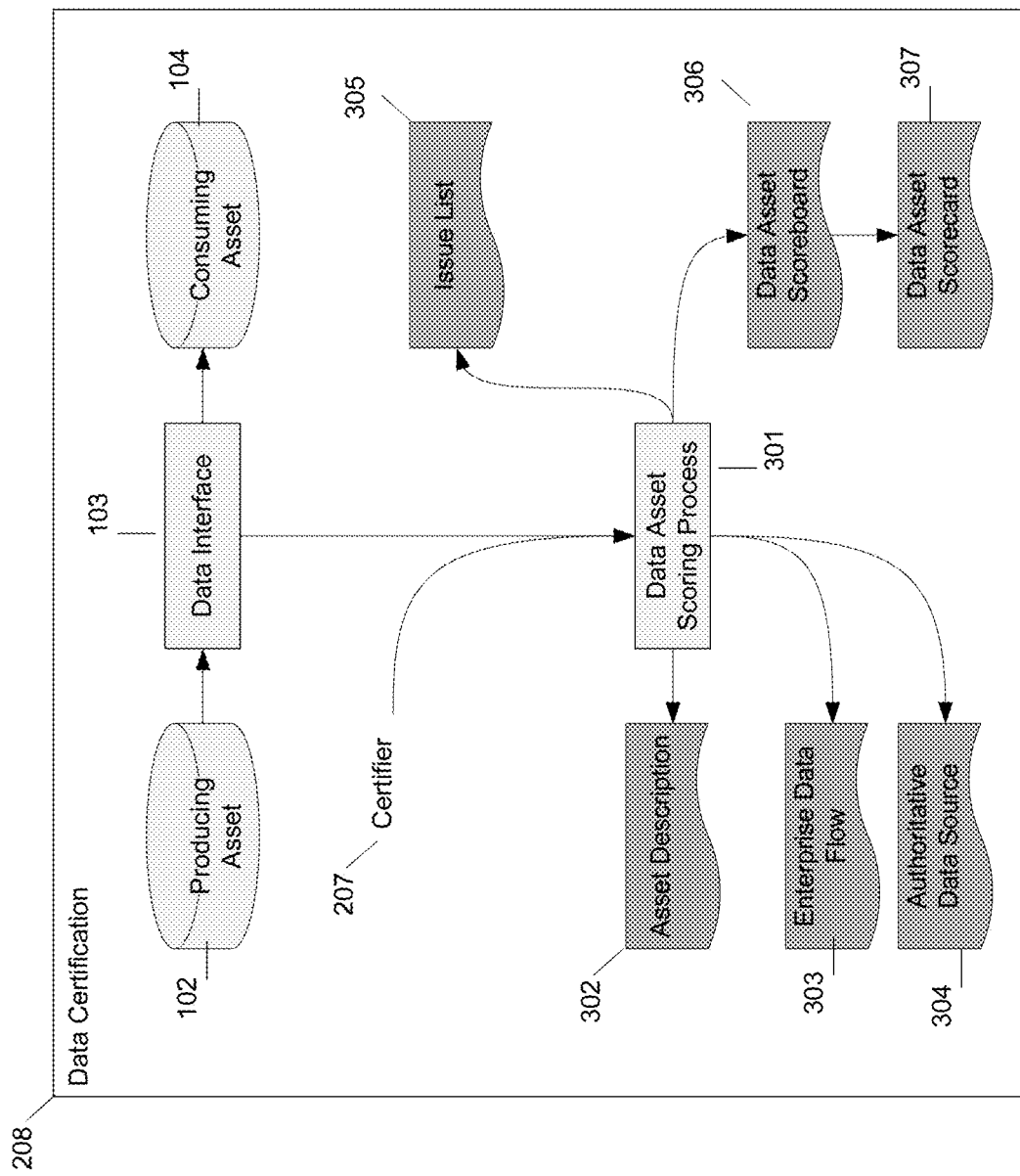
FIG. 3 represents an illustration of the data certification process.

Data person 202 includes any hardware or individuals that are affected by data. Data owner 229 includes any hardware or individuals within the notions of technical and business data ownership that are referenced often in data discussions. However, in the realm of data assets it is more effective to consider ownership from the perspective of producers and consumers. The producer/consumers model offers more flexibility in situations where the business/technical view breaks down—primarily in areas where both the producer and consumers are technical teams with extended interface chains. The scope of an owner is recognized from the notion of a data asset FIG. 3 represents an illustration of the data certification 208 process. Data certification 208, as discussed in brief above, operates within the data interface 103 between a producing asset 102 and consuming asset 104. The data interface 103 inputs to the data asset scoring process 301. The data asset scoring process 301 receives input from the certifier 207. The data asset scoring process 301 output to an asset description 302, enterprise data flow 303 and authoritative data source 304. Data asset scoring process 301 also outputs and issue list 305. The data asset scoring process 301 provides output to the data asset scoreboard 306 and subsequently to the data asset scorecard 307.

Data asset scoring process 301 is the step by step process performed by the certifier to produce the outputs described herein. Asset description 302 is provided and includes the standard artifact that certifier completes during a data certifications which describes the state of the well-defined data asset metrics. Enterprise data flow 303 is also output and includes the business flow of data for the entire enterprise. Authoritative data sources 304 are output and provide the enterprise library of data sources and which one to use based on data subject or business process/function in use. The enterprise roll-up of all outstanding and ongoing data issues found during data certification is provided in an issue list 305 along with asset services to remediate the data assets issues.

The results at a high-level of all the asset metric scores accumulated from data certifications may be output in a data asset scoreboard 306. The quarterly role up of all certifications performed and reported to leadership are output in a data asset scorecard 307.

Data certification 208 may be performed to certify conflicting data assets, authoritative data assets, new data assets, and enterprise data subjects. To certify conflicting data assets occurs when two data assets are in conflict with one another, both assets are certified, conflicts resolved, and the lower certified asset is ceased use. The focus of the certification is to resolve data issues including the conflicts between two assets. After certification 208 a score may be issued that includes a recommendation to resolve the conflict. This score may focus on fit for use 209, and may also include ownership 210, people knowledge 211, artifacts 212, and controls 213. The official data asset may not always win, as a "challenge" enhances the assets in system 101.

Certification of authoritative data assets may also be performed. This may occur when a user has two or more data assets and the authoritative source is unknown. In this case both assets may be certified based on a declared business objective, referred to as subject, then recommending and tracking the asset of choice. The focus on this certification is on resolving issues to identify authoritative sources of assets. The key themes of authoritative data and certification includes that the certification is the mandated arm of governance, certification may be leveraged to identify truth in system 101, certification classifies differences among authoritative assets, and authoritative source is the asset with the higher certification score that meets the declared business objective, i.e., has the right subject.

New data assets may also be certified. When the system 101 creates a new data asset, the proposed asset may have a pre-certification performed on it so that it adheres to certification standards prior to implementation. System 101 is creating a new data asset and may us certification to develop the asset according to standards. The four key themes of new data assets and certification include certification being the mandated arm of governance, certification may be leveraged to adhere to governance standards from the start, certifiers and developers may interact frequently, and certification may be leveraged to establish business requirements and ensure development adheres to the requirements.

Enterprise data subjects may also be certified. When data subjects need to be consistent at an enterprise or system level. Certification may be used to identify at an element level across large areas of data assets. The focus of certification is to resolve data issues including identifying data subjects and flow. The ley themes of data subjects and certification include identifying the business need and classify a data subject, identifying the data subject at the physical data element, identifying where the data elements originate from, and identifying where the data elements move to and are used.

FIG. 4 illustrates data assets 203 in a continuous flow of data from source Repository A to reporting Repository C. In combination with FIG. 3, FIG. 4 enables the tracing of ownership from producing and consuming assets when issues arise. Data assets 203 include any collection of data elements used for business decision making. As shown in FIG. 2, data assets 203 may include data repositories 204, data interfaces 205 and data subjects 206. Data repositories 204 include databases, schema, subject areas, and software tools. Data interfaces 205 include point of consumption, crossing of organizational boundaries, and agreements on use and purpose of assets. Data subjects 206 include what the data means to a business, and are aligned to decision making, generally is agnostic to technology, and may be referred to as domain. Data subjects 206 operate with repository 1 412 across interface 1 413 to repository 2 414 and from repository 2 414 across interface 2 415 to repository 3 416.

Figure 5:
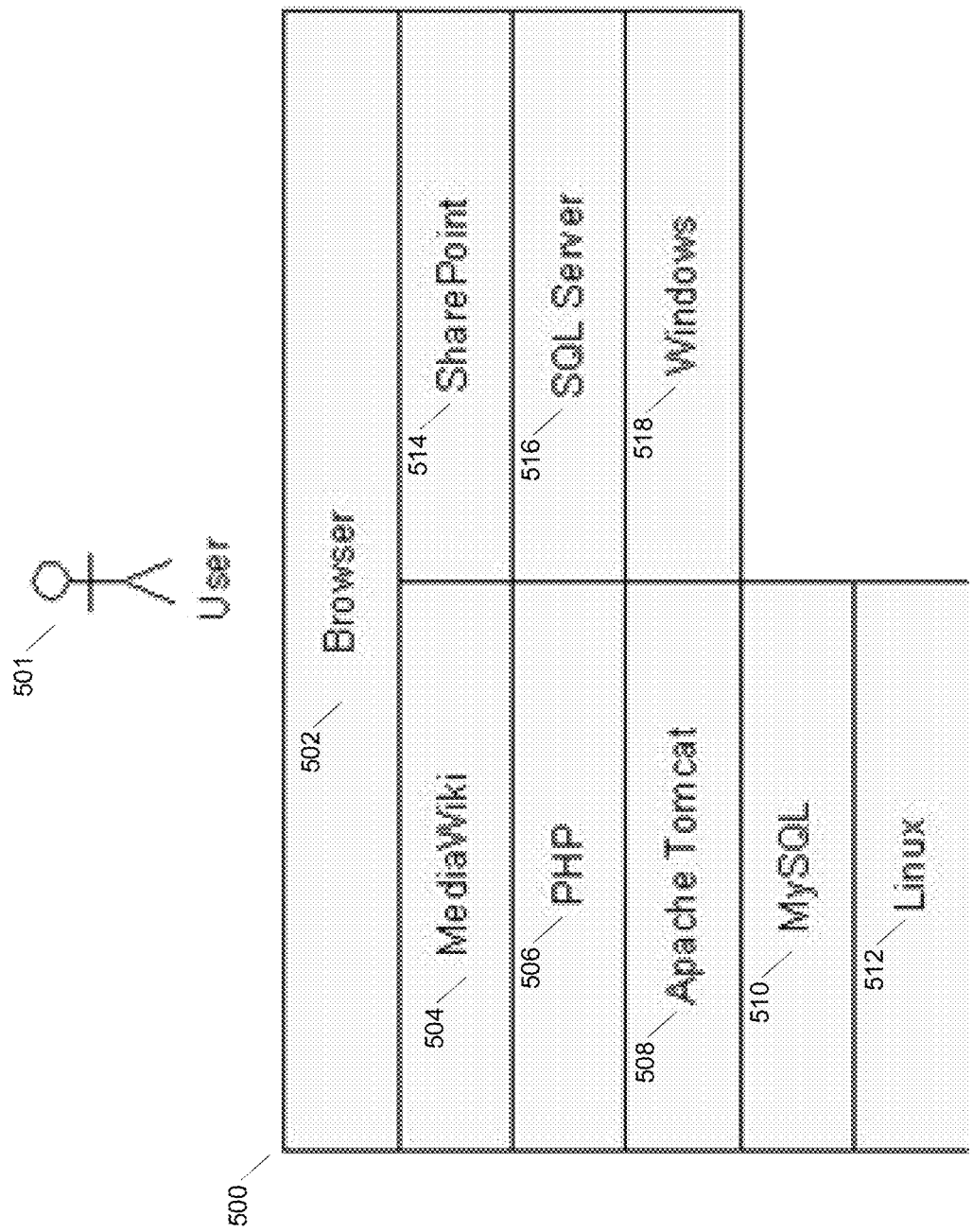
FIG. 5 illustrates a software stack configured for use in the present system and method.

FIG. 5 illustrates a software stack 500 configured for use in the present system and method. This stack may be used in the respective computers of the elements described in FIGS. 1-4, for example. Software stack 500 may include any suitable software to perform the described point of use data governance. By way of non-limiting example, software stack 500 may include free, open source wiki software, used to power wiki websites such as Wikipedia, Wiktionary and Commons, developed by the Wikimedia Foundation and others. MediaWiki 504 is the software used by Wikipedia and it is one of the most powerful wiki software suites available. MediaWiki 504 may be used in as software to further the present point of use data governance. MediaWiki 504 software includes the LAMP stack—Linux 512, Apache Tomcat 508, MySQL 510, and PHP 506.

The acronym LAMP refers to first letters of the four components of a solution stack, composed entirely of free and open-source software, suitable for building high-availability heavy-duty dynamic web sites, and capable of serving tens of thousands of requests simultaneously. The meaning of the LAMP acronym depends on which specific components are used as part of the actual bundle:

Linux 512, the operating system, i.e. not just the Linux kernel, but also glibc and some other essential components of an operating system, may be used as the operating language. Linux 512 generally is a Unix-like and mostly POSIX-compliant computer operating system assembled under the model of free and open source software development and distribution.)

Apache 508 may be the web server application, such as a browser. While other web server applications may be used, Apache 508 generally supports a variety of features, many implemented as compiled modules which extend the core functionality. Apache 508 provides a variety of Multiprocessing Modules (MPMs) which allow Apache 508 to run in a process-based, hybrid (process and thread) or event-hybrid mode, to better match the demands of each particular infrastructure.

MySQL 510 or MariaDB, the database management system, generally is an open-source relational database management system (RDBMS). The SQL phrase stands for Structured Query Language. Other databases such as those provided by Oracle may also be used.

PHP 506, Perl, or Python, are scripting languages (respectively programming languages) used for dynamic web pages and web development. PHP 506 is a popular general-purpose scripting language that is especially suited to web development. Generally regarded as fast, flexible and pragmatic, PHP 506 powers everything from blogs to the most popular websites in the world. Other languages may be used as the present invention is not tied specifically to PHP 506.

Human 501 accesses may include access via a browser 502 which may include a software application for retrieving, presenting and traversing information resources on the World Wide Web or information in private networks or files in file systems. An information resource is identified by a Uniform Resource Identifier (URI/URL) and may be a web page, image, video or other piece of content. Other links to information resources may also be used. Hyperlinks present in resources enable users easily to navigate their browsers to related resources. Browser 502 may take the form of a major web browser such as Firefox, Internet Explorer, Google Chrome, Opera, and Safari, for example.

Software stack 500 may also include SharePoint 514, which may include SQL server 516 and Windows 518. Generally, SharePoint 514 is the document storage and retrieval repository. SQL Server 516 and Windows 518 are the tools that SharePoint 514 utilizes to store information. SharePoint 514 allows for storage, retrieval, searching, archiving, tracking, management, and reporting on of electronic documents and records and allows for collaborative real-time editing, and encrypted/information rights managed synchronization. SharePoint 514 provides intranet or intranet portal as a way to centralize access to enterprise information and applications by aiding in managing internal communications, applications and information more easily.

Figure 6:
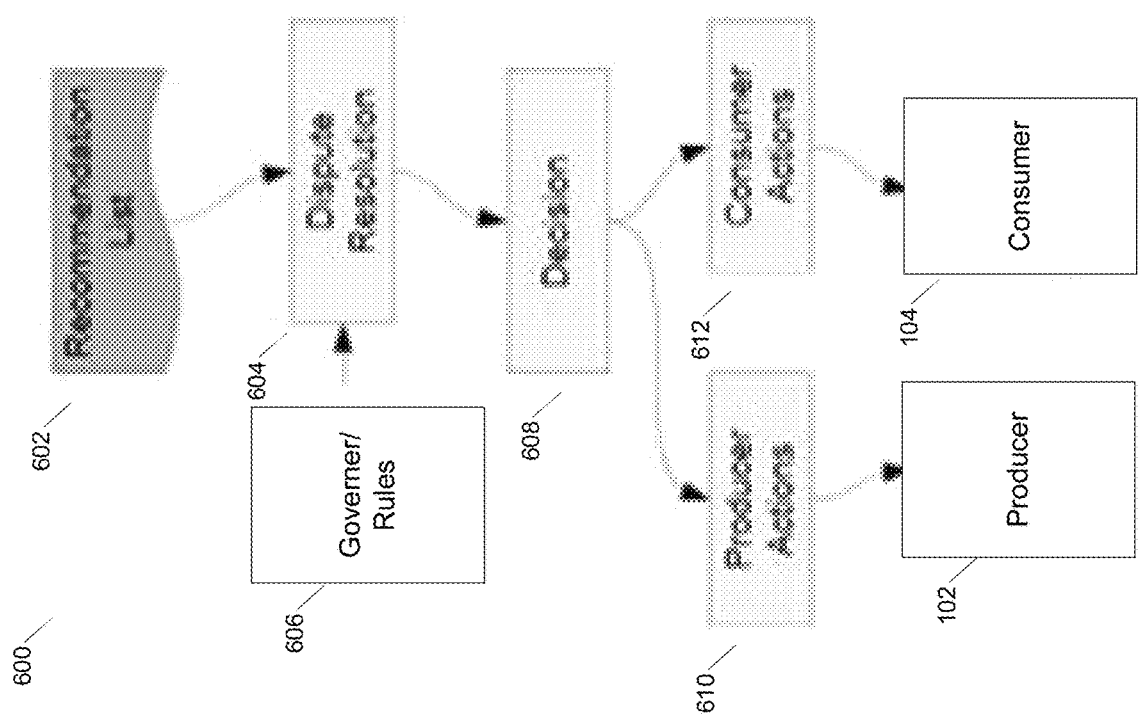
FIG. 6 illustrates an issue resolution system for point of use data governance.

FIG. 6 illustrates an issue resolution system 600 for point of use data governance. System 600 includes a recommendation list 602 that is derived and maintained, being primarily derived from issue list 305 of FIG. 3. Recommendation list 602 provides input to dispute resolution 604, for each entry on list 602 which receives input from a governing body 606 to reach a decision 608 on a per unit basis. Decision 608 may include both producer actions 610 and consumer actions 612 for a given entry within list 602. Producer actions 610 are output to producer 102 and consumer actions are output to consumer 104.

Figure 7:
FIG. 7 illustrates a method for point of use data governance.

FIG. 7 illustrates a method 700 for point of use data governance. Method 700 includes step 710 that connects producers and consumers across an interface. On a connected 710, step 720 includes categorizing and aligning data assets for producers and consumers. Step 730 includes resolving disputes on data assets across the interface. Step 740 includes reusing producer's data by future consumers based on right fit criteria.

Figure 8:
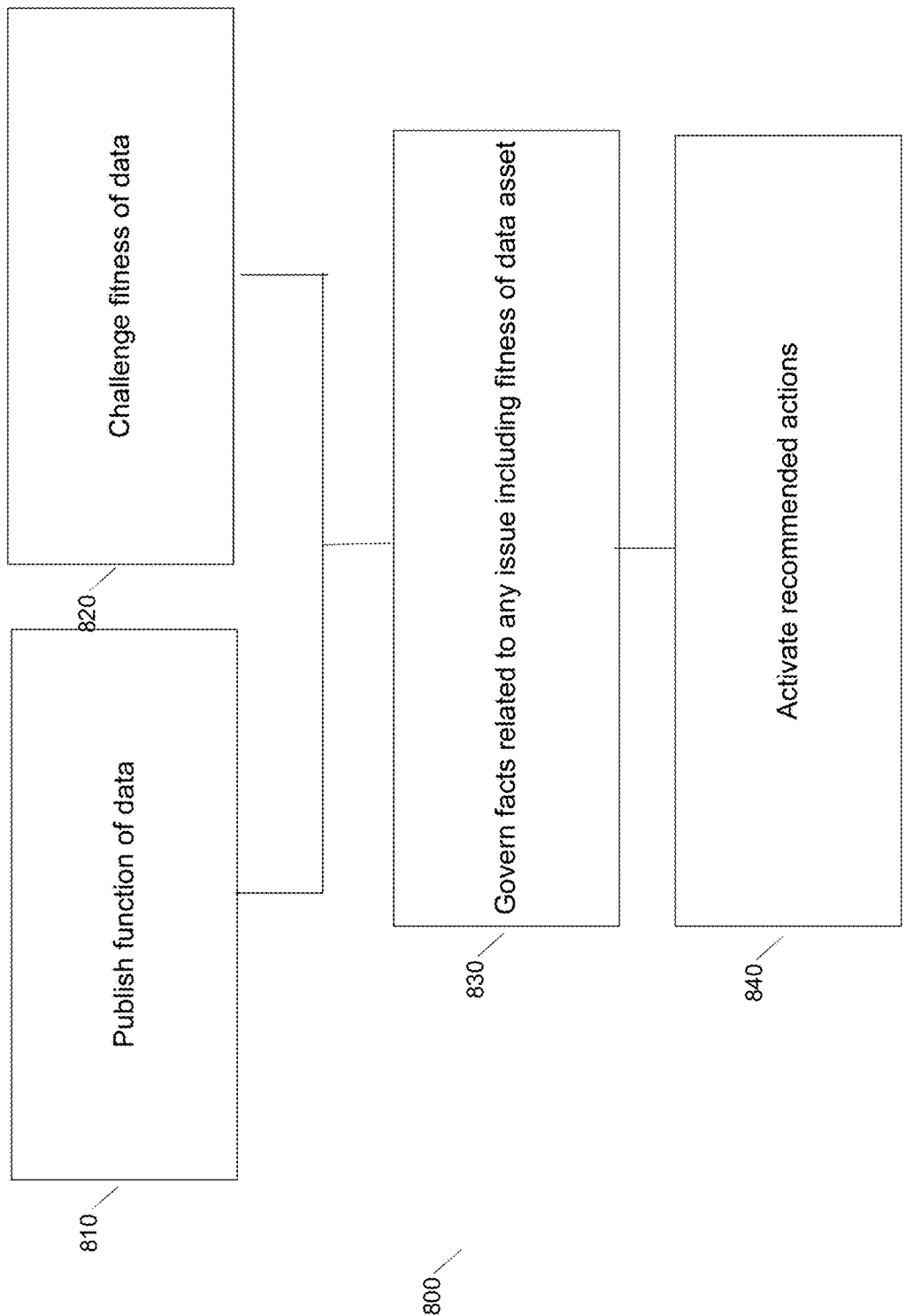
FIG. 8 illustrates a method for producers and consumers within the point of use data governance system.

FIG. 8 illustrates a method 800 for producers and consumers within the point of use data governance system. Producers may publish the function of data at step 810. Consumers challenge the fitness of data at step 820. Through publishing 810 and challenging 820 facts are created that govern any issue including fitness of the data asset at step 830. At step 840 recommended actions are activated with the system based on the fitness of respective data assets.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for producers and consumers of data within a point of use data governance system, the method comprising:
    identifying a data asset stored in a repository, the data asset being a collection of data elements used for business decision making;
    providing, by a producer, a function of the identified data asset across an interface;
    challenging, by at least one consumer, a fit for use of the identified data asset in the point of use data governance system, the challenge of the fit for use of the identified data asset including at least one issue with the use of the identified data asset within the point of use data governance system;
    identifying facts that govern the at least one issue including the fit for use of the identified data asset via the providing and challenging;
    resolving the at least one issue of the data asset across the interface based on the identified facts by updating the data asset and fit for use; and
    updating the data asset in the repository based on the resolving.

2. The method of claim 1 wherein the producers and consumers are connected across an input-output (IO) device.

3. The method of claim 1, further comprising creating, by a producer, at least one data asset stored in a repository for use by at least one consumer.

4. The method of claim 1 wherein the challenging comprises categorizing and aligning data assets, in a processor, for the producer and the at least one consumer as the data asset is transmitted across an IO device as the data asset is in use.

5. The method of claim 1 wherein creating facts comprises resolving disputes on the data asset, via a processor, across an IO device, a dispute occurring when an authoritative source of the data asset is unknown or where two or more data assets for the same purpose exist.

6. The method of claim 1, further comprising providing the data asset to future consumers based on right fit as defined by accuracy for the function.

7. The method of claim 1 wherein the data asset is categorized at a subject level.

8. The method of claim 1 wherein creating facts includes resolving any issue using resolution rules.

9. The method of claim 1 wherein the data asset is a certified data asset.

10. The method of claim 1 wherein the data asset is a new data asset categorized according to a set of system rules.

11. The method of claim 1, further comprising assessing, by a certifier, the asset based on defined metrics.

12. The method of claim 1 wherein a health status of the data asset is determined through a data asset scoring process.

13. A non-transient computer readable medium including hardware design code stored thereon which when executed by a processor cause a system to perform a method for producers and consumers of data within a point of use data governance system, said method comprising:
    identifying a data asset stored in a repository, the data asset being a collection of data elements used for business decision making;
    providing, by a producer, a function of the identified data asset across an interface;
    challenging, by at least one consumer, a fit for use of the identified data asset in the point of use data governance system, the challenge of the fit for use of the identified data asset including at least one issue with the use of the identified data asset within the point of use data governance system;
    identifying facts that govern the at least one issue including the fit for use of the identified data asset via the providing and challenging;
    resolving the at least one issue of the data asset across the interface based on the identified facts by updating the data asset and fit for use; and updating the data asset in the repository based on the resolving.

14. The computer readable medium of claim 13 wherein the producers and consumers are connected across an input-output (IO) device.

15. The computer readable medium of claim 13, further comprising creating, by a producer, at least one data asset stored in a repository for use by at least one consumer.

16. The computer readable medium of claim 13 wherein the challenging comprises categorizing and aligning data assets, in a processor, for the producer and the at least one consumer as the data asset is transmitted across an IO device as the data asset is in use.

17. The computer readable medium of claim 13 wherein creating facts comprises resolving disputes on the data asset, via the processor, across an IO device, a dispute occurring when an authoritative source of the data asset is unknown or where two or more data assets for the same purpose exist.

18. The computer readable medium of claim 13, further comprising providing the data asset to future consumers based on right fit as defined by accuracy for the function.

19. The computer readable medium of claim 13, further comprising assessing, by a certifier, the asset based on defined metrics.

20. The computer readable medium of claim 13 wherein a health status of the data asset is determined through a data asset scoring process.

\* \* \* \* \*